United States Patent
HariRama Subbu et al.

(10) Patent No.: US 12,164,471 B2
(45) Date of Patent: Dec. 10, 2024

(54) SYSTEMS AND METHODS FOR ENTITY INTERESTINGNESS-BASED RETENTION AND REMOVAL

(71) Applicant: MICRO FOCUS LLC, Santa Clara, CA (US)

(72) Inventors: Venkatesh HariRama Subbu, Ottawa (CA); Asad Narayanan, Ottawa (CA); Maria Pospelova, Ottawa (CA); Stephan F. Jou, Ottawa (CA)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/721,911

(22) Filed: Apr. 15, 2022

(65) Prior Publication Data

US 2023/0334010 A1    Oct. 19, 2023

(51) Int. Cl.
*G06F 16/11* (2019.01)
*G06F 16/21* (2019.01)
*G06F 16/22* (2019.01)

(52) U.S. Cl.
CPC ............ *G06F 16/125* (2019.01); *G06F 16/21* (2019.01); *G06F 16/2282* (2019.01)

(58) Field of Classification Search
CPC ..... G06F 16/125; G06F 16/21; G06F 16/2282
See application file for complete search history.

(56) References Cited

U.S. PATENT DOCUMENTS

| | | | |
|---|---|---|---|
| 8,887,286 B2 | 11/2014 | Dupont | |
| 9,307,507 B2* | 4/2016 | Zhou | H04W 40/20 |
| 10,503,348 B2* | 12/2019 | Maheshwari | G06T 11/206 |
| 10,558,797 B2* | 2/2020 | Wright | G06F 21/45 |
| 10,839,099 B2* | 11/2020 | Vogel | G06F 21/6245 |
| 10,887,335 B2* | 1/2021 | Pilkington | H04L 63/1425 |
| 11,100,539 B2* | 8/2021 | Shiffert | H04W 76/14 |
| 2016/0364727 A1* | 12/2016 | DeLawter | G06Q 20/389 |
| 2019/0370676 A1* | 12/2019 | Pinckney | G06Q 30/02 |
| 2020/0210373 A1* | 7/2020 | Chao | H04W 4/14 |
| 2021/0026982 A1* | 1/2021 | Amarendran | G06F 21/6254 |
| 2021/0201330 A1* | 7/2021 | Jain | G06Q 50/265 |
| 2021/0216930 A1* | 7/2021 | Huber | G06Q 10/06313 |
| 2021/0374749 A1* | 12/2021 | Vukich | G06Q 20/389 |

* cited by examiner

*Primary Examiner* — Miranda Le
(74) *Attorney, Agent, or Firm* — Sheridan Ross P.C.

(57) ABSTRACT

A system includes a processor and a memory coupled with and readable by the processor and storing therein a set of instructions. When executed by the processor, the processor is caused to receive application events associated with an application and create data records based on the application events. The processor is further caused to compute an interestingness value for each of the data records based on a goal of the application, assign the computed interestingness value to each of the data records and store each of the data records with the assigned interestingness value.

18 Claims, 10 Drawing Sheets

Financial System Data Table ⎯700

| Transaction Number 704 | User 708 | Time 712 | Location 716 | Amount 720 | Approval 724 | ●●● 728 | Interestingness Value 732 |
|---|---|---|---|---|---|---|---|
| Transaction 101 | User A | 17:12 | HT123 | $300.00 | YES | | 0.3 |
| Transaction 102 | User E | | | | | | |
| Transaction 103 | User B | 19:05 | VX690 | $85.00 | YES | | 0.3 |
| Transaction 104 | User C | | | | | | |
| Transaction 105 | User H | | | | | | |
| Transaction 106 | User F | | | | | | |
| Transaction 107 | User A | 16:59 | HT123 | $300.00 | YES | | 0.1 |
| Transaction 108 | User B | 18:53 | MH304 | $165.00 | YES | | 0.2 |
| Transaction 109 | User C | | | | | | |
| Transaction 110 | User C | | | | | | |
| Transaction 111 | User G | | | | | | |
| Transaction 112 | User D | | | | | | |
| Transaction 113 | User E | | | | | | |
| Transaction 114 | User A | 17:32 | H123 | $300.00 | YES | | 0.1 |
| Transaction 115 | User C | | | | | | |
| Transaction 116 | User D | | | | | | |
| Transaction 117 | User B | 11:50 | YGH56 | $500.00 | YES | | 0.3 |
| Transaction 118 | User A | 2:30 | XX234 | $2000.00 | NO | | 0.9 |
| Transaction 119 | User G | | | | | | |
| Transaction 120 | User A | 17:15 | HT123 | $300.00 | YES | | 0.1 |

*FIG. 7*

Medical Records System Data Table

800

| Data Record 804 | Test 808 | Date 812 | Results 816 | Status 820 | ••• 824 | Interestingness Value 828 |
|---|---|---|---|---|---|---|
| Patient A | | | | | | |
| | Check-up | 1/20/2000 | Good | Good | | 0.1 |
| | Diabetes | 4/30/2001 | Postive | Fair | | 0.5 |
| | Blood test | 9/4/2001 | Good | Fair | | 0.3 |
| | Colon test | 1/5/2002 | Positive | Fair | | 0.7 |
| | | | | | | |
| Patient B | | | | | | |
| | Check-up | 5/13/200 | Good | Good | | 0.1 |
| | Blood test | 5/12/200 | Good | Good | | 0.1 |
| | | | | | | |
| Patient C | | | | | | |
| | Check-up | 9/16/2000 | Moderate | Fair | | 0.2 |
| | Blood test | 9/16/2000 | Good | Fair | | 0.2 |
| | Cancer test | 1/16/2001 | Positive | Poor | | 0.9 |
| | Blood test | 2/17/2001 | Fair | Poor | | 0.8 |

*FIG. 8*

User Interface Prompt – Financial System
900

Filter data records having Interestingness Value of *** or less

☐ Monthly   ☒ Quartly   ☐ Yearly

*FIG. 9*

User Interface Prompt – Medical Records System
1000

Filter data records having Interestingness Value of *** or less

[X] Monthly  [ ] Quartly  [ ] Yearly

*FIG. 10*

SYSTEMS AND METHODS FOR ENTITY INTERESTINGNESS-BASED RETENTION AND REMOVAL

FIELD

The present disclosure relates generally to systems and methods for data retention and removal in a data repository environment and more particularly to systems and methods for data retention and removal based on the interestingness of the data compared with the purpose or goal of an application associated with the data repository.

BACKGROUND

There exist tools available to assist in the maintenance and clearance of data stored in data repositories. Conventional maintenance tools are inefficient in maintaining and clearing data because these maintenance tools generally depend on explicit rules for the removal or the retention of data, with each rule implemented using routines for each specific rule. Examples of common implemented rules used by data maintenance tools include: deleting data based on time/age thresholds (i.e., older data deleted before newer data), deleting data based on a specific customer, deleting data based on historical patterns, etc., and combinations thereof. Developing a custom data maintenance tool can be a challenging, time-consuming, and costly endeavor. Current approaches for developing a custom data maintenance tool are limited to the use of the data maintenance tool with a particular application. Moreover, the simple approach to the retention and the removal of data (i.e., one size fits all), by keeping all data except for data older than 30 days, treats all data the same and does not provide for a flexible and more dynamic approach. Therefore, there is a need for an easily adaptable and customizable data repository maintenance tool for all types of applications associated with the data repository designed for the retention and the removal of data based on the interestingness of the data.

SUMMARY

Embodiments of the present disclosure provide systems, methods and non-transitory computer-readable mediums for data retention and removal based on the interestingness of the data compared with the purpose or goal of an application. According to one embodiment of the present disclosure, a system includes a processor and a memory coupled with and readable by the processor and storing therein a set of instructions. When executed by the processor, the processor is caused to receive application events associated with an application and create data records based on the application events. The processor is further caused to compute an interestingness value for each of the data records based on a goal of the application, assign the computed interestingness value to each of the data records and store each of the data records with the assigned interestingness value.

Aspects of the above system include wherein the instructions, when executed by the processor, causes the processor to receive a threshold interestingness value, compare the threshold interestingness value to the assigned interestingness value for each of the stored data records to determine which stored data records have an assigned interestingness value below the threshold interestingness value and remove the stored data records having an interestingness value below the threshold interestingness value.

Aspects of the above system include wherein the data records are stored in data tables of a data repository.

Aspects of the above system include wherein the instructions, when executed by the processor, causes the processor to generate new data tables of data records based on the stored data records not removed.

Aspects of the above system include wherein the interestingness value is assigned to each of the data records after each data record has been created.

Aspects of the above system include wherein the interestingness value is assigned to each of the data records after all of the data records have been created.

Aspects of the above system include wherein the instructions, when executed by the processor, causes the processor to compute an adjusted interestingness value to a stored data record based on a subsequent application event.

Aspects of the above system include wherein computing an interestingness value for each of the data records further includes consider previously stored data records in computing the interestingness value.

Aspects of the above system include wherein the application includes financial applications, medical applications, regulatory applications or machine learning applications.

Aspects of the above system include wherein receiving a threshold interestingness value includes receive the threshold interestingness value on a periodic basis.

Aspects of the above system include wherein receive a threshold interestingness value includes receive the threshold interestingness value on an ad-hoc basis.

According to one embodiment of the present disclosure, a method includes receiving, by a processor, application events associated with an application, creating, by the processor, data records based on the application events, computing, by the processor, an interestingness value for each of the data records based on a goal of the application, assigning, by the processor, the computed interestingness value to each of the data records and storing, by the processor, each of the data records with the assigned interestingness value.

Aspects of the above method include receiving, by the processor, a threshold interestingness value, comparing, by the processor, the threshold interestingness value to the assigned interestingness value for each of the stored data records to determine which stored data records have an assigned interestingness value below the threshold interestingness value and removing, by the processor, the stored data records having an interestingness value below the threshold interestingness value.

Aspects of the above method include wherein the data records are stored in data tables of a data repository.

Aspects of the above method include generating, by the processor, new data tables of data records based on the stored data records not removed.

Aspects of the above method include assigning the interestingness value to each of the data records after each data record has been created.

Aspects of the above method include assigning the interestingness value to each of the data records after all of the data records have been created.

Aspects of the above method include computing an adjusted interestingness value for a stored data record based on a subsequent application event.

Aspects of the above method include computing the interestingness value for each of the data records based on previously stored data records.

According to one embodiment of the present disclosure, a non-transitory, computer-readable medium includes a set of instructions stored therein which when executed by a processor, causes the processor to receive application events associated with an application, create data records based on the application events, compute an interestingness value for each of the data records based on a goal of the application, assign the computed interestingness value to each of the data records and store each of the data records with the assigned interestingness value.

These and other needs are addressed by the various embodiments and configurations of the present disclosure. The present disclosure can provide a number of advantages depending on the particular configuration. These and other advantages will be apparent from the disclosure contained herein.

Embodiments of the present disclosure provide a number of advantages over conventional maintenance tools for databases. As discussed above, traditional maintenance tools for databases generally depend on explicit rules for the removal or the retention of data, with each rule implemented using routines for each specific rule. Moreover, developing a custom data maintenance tool for databases can be a challenging, time-consuming, and costly endeavor. By retaining and removing data from the databased based on the interestingness of the data, the overall size of the database is dramatically reduced in comparison to traditional databases. This results in a much more efficient database that can support irrelevant data being removed while relevant data is retained than was previously possible using the same hardware.

Because embodiments of the present disclosure can support irrelevant data being removed while relevant data is retained using the same hardware, this allows embodiments of the present disclosure to support a higher number of transactions more efficiently and at lower cost. The described embodiments of the present disclosure make the existing hardware more efficient while reducing the overall cost to implement the data maintenance tools on a large scale which was previously impossible.

In addition, the data retention and removal based on the interestingness processes described herein are designed to support transactions (e.g., financial transactions, etc.) in real-time. Being able to support transactions in real-time is clearly something that cannot be done practically using a mental process. Instead, the data retention and removal based on the interestingness processes described herein will only work practically in a computerized environment.

Being able to support a higher number of transactions more efficiently and at a lower cost cannot be performed manually and in real-time. For example, being able to support a higher number of transactions more efficiently and at a lower cost involves managing terra bytes of information from a very large number of devices to identify issues from a very large number of users in real-time (e.g., thousands of users). Being able to support a higher number of transactions more efficiently and at a lower cost would simply take too long if performed using a pen and paper.

According to embodiments of the present disclosure, multiple applications can be running on the system at the same time. As such, the multiple applications use the same database and some of the events of the multiple applications may overlap. For example, an event for application A may cause changes to the interestingness score of records that application A and another application use. For example, a human resource (HR) application and a corporate credit application may be two different applications but have events that affect each other. An example may be where a user is terminated and is still making credit card charges. The interestingness of the charges for the corporate credit application will be much higher based on the event (termination) in the HR application. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. For example, the computer readable medium(s) may be non-transitory or non-volatile medium, such as a magnetic disk or solid-state non-volatile memory or volatile medium such as PAM.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 7 is an example financial system data table representing example financial transaction data records collected for use in a data maintenance system according to an embodiment of the present disclosure.

FIG. 8 is an example medical records system data table representing example medical data records collected for use in a data maintenance system according to an embodiment of the present disclosure.

FIG. 9 is a graphical representation of an example graphical user interface (GUI) prompt associated with a data maintenance system for a financial system according to embodiments of the present disclosure.

FIG. 10 is a graphical representation of an example GUI prompt associated with a data maintenance system for a medical records system according to embodiments of the present disclosure.

Figure 1:
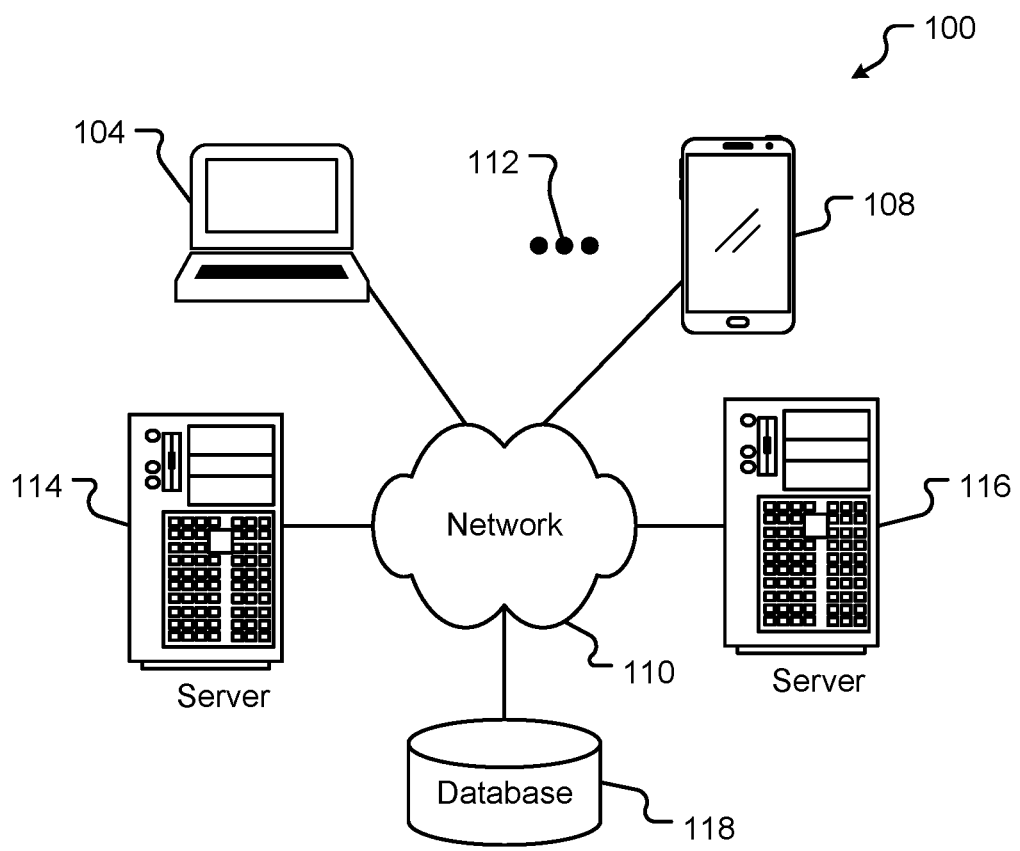
FIG. 1 is a block diagram illustrating elements of an example computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Embodiments of the present disclosure are directed to systems and methods for data retention and removal based on the interestingness of the data compared with the purpose or goal of an application associated with the data repository. Data is assigned different levels of interestingness based on the purpose or goal of the application that stores the data to determine whether, when, and how much the data should be removed from the data repository. Data associated with different levels of interestingness are identified and a removal function is performed on the data associated with the levels of interestingness in accordance with removal rules. Periodic threshold analysis is used for the retention and removal of the data from the data repository.

As defined herein, a data repository includes, but is not limited to a collection of data tables. Each of the data tables includes reference to one or more data records. As defined herein, interestingness includes, but is not limited to a function that computes a value between 0 and 1, which quantifies how interesting, relevant and/or important a particular data repository's data record is to the data repository's goal(s); the more interesting, relevant and/or important a data record is to the repository's goal(s) the higher the interestingness value (e.g., the closer the interestingness value is to 1).

For example, a financial fraud system that detects anomalous transactions indicative of credit card theft, may remove data records associated with the financial fraud system based on time (e.g., the age of a transaction log associated with the financial fraud system). According to embodiments of the present disclosure, the financial fraud system includes an application associated with a data repository that includes all credit card transactions for a financial institution such as a bank, credit union, etc. The data records include all individual credit card transactions for credit card customers. The interestingness function computes a value that, for example, may return low values if the credit card transactions for a particular customer is older than three months or is a combination of account holder, store, and transaction amount that is not very unusual: for example, one year ago, Jane Doe at Acme Gas spending $80.00 is not interesting for a fraud detection system because Jane does this every week, and this happened over a year ago.

As another example, a machine learning system that uses predictive models may retain and remove data based on the data's impact on the predictive models based on their statistical features and that are statistically correlated as determined according to conventional or other techniques. Moreover, the data can be processed by one or more data analysis algorithms, such as data clustering algorithms, data classification algorithms, association rule mining algorithms, and/or any algorithms that are considered to be similar to the ones that will be used for predictive learning.

As a third example, a data archive system may retain and remove data based on compliance requirements, such as data retention policies such as the General Data Protection Regulation (GDPR)'s Rights to be Forgotten data privacy policies, which forces a data archive system to remove all data related to an individual person, when requested by that person. In general, the methods and systems include associating data with different levels of interestingness and performing a removal function on the data associated with the levels of interestingness in accordance with removal rules.

For each of the examples described above, interestingness includes, but is not limited to a function that computes a value between 0 and 1, which quantifies how interesting, relevant and/or important a particular data repository's data record is to the data repository's goal(s); the more interesting, relevant and/or important a data record is to the repository's goal(s) the higher the interestingness value (e.g., the closer the interestingness value is to 1).

FIG. 1 is a block diagram illustrating elements of an example computing environment 100 in which embodiments of the present disclosure may be implemented. More specifically, this example illustrates a computing environment 100 that may function as the servers, user computers, or other systems provided and described herein. The environment 100 includes one or more user computers, or computing devices, such as a computer 104, a communication device 108, and/or more devices 112. The devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These devices 104, 108, 112 may also have any of a variety of applications, including for example, database client and/or server applications, and web browser applications. Alternatively, the devices 104, 108, 112 may be any other electronic device, such as a thin-client computer, Internet-enabled mobile telephone, and/or personal digital assistant, capable of communicating via a network 110 and/or playing audio, displaying images, etc. Although the example computer environment 100 is shown with two devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The environment 100 may also include one or more servers 114, 116. For example, the servers 114 and 116 may comprise build servers, which may be used to test webpage layout on various screen sizes via the device 104, 108, 112. The servers 114 and 116 can be running an operating system including any of those discussed above, as well as any commercially available server operating systems. The servers 114 and 116 may also include one or more file and/or application servers, which can, in addition to an operating system, include one or more applications accessible by a client running on one or more of the devices 104, 108, 112. The server(s) 114 and/or 116 may be one or more general purpose computers capable of executing programs or scripts in response to the computers 104, 108, 112. As one example, the servers 114 and 116, may execute one or more automated tests. The automated tests may be implemented as one or more scripts or programs written in any programming language, such as Java™, C, C #®, or C++, and/or any scripting language, such as Perl, Python, or Tool Command Language (TCL), as well as combinations of any programming/scripting languages. The server(s) 114 and 116 may also include database servers, including without limitation those commercially available from Oracle®, Microsoft®, Sybase®, IBM® and the like, which can process requests from database clients running on the device 104, 108, 112.

The tests created and/or initiated by the device 104, 108, 112 (including tests created by other devices not illustrated) are shared to the server 114 and/or 116, which then may test and/or deploy the web sites/webpages. The server 114 and/or 116 may transfer the generated webpage layout and/or data related to the same to the device 104, 108, 112. Although for ease of description, FIG. 1 illustrates two servers 114 and 116, those skilled in the art will recognize that the functions described with respect to servers 114, 116 may be performed by a single server and/or a plurality of specialized servers, depending on implementation-specific needs and parameters. The computer systems 104, 108, 112, and servers 114 116 may function as the system, devices, or components described herein.

The environment 100 may also include a database 118. The database 118 may reside in a variety of locations. By way of example, database 118 may reside on a storage medium local to (and/or resident in) one or more of the computers/servers 104, 108, 112, 114, 116. Alternatively, it may be remote from any or all of the computers/servers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers/servers 104, 108, 112, 114, 116 may be stored locally on the respective computer/server and/or remotely, as appropriate. The database 118 may be used to store webpage layout data (e.g., respective locations of a plurality of elements), alerts, etc.

Figure 2:
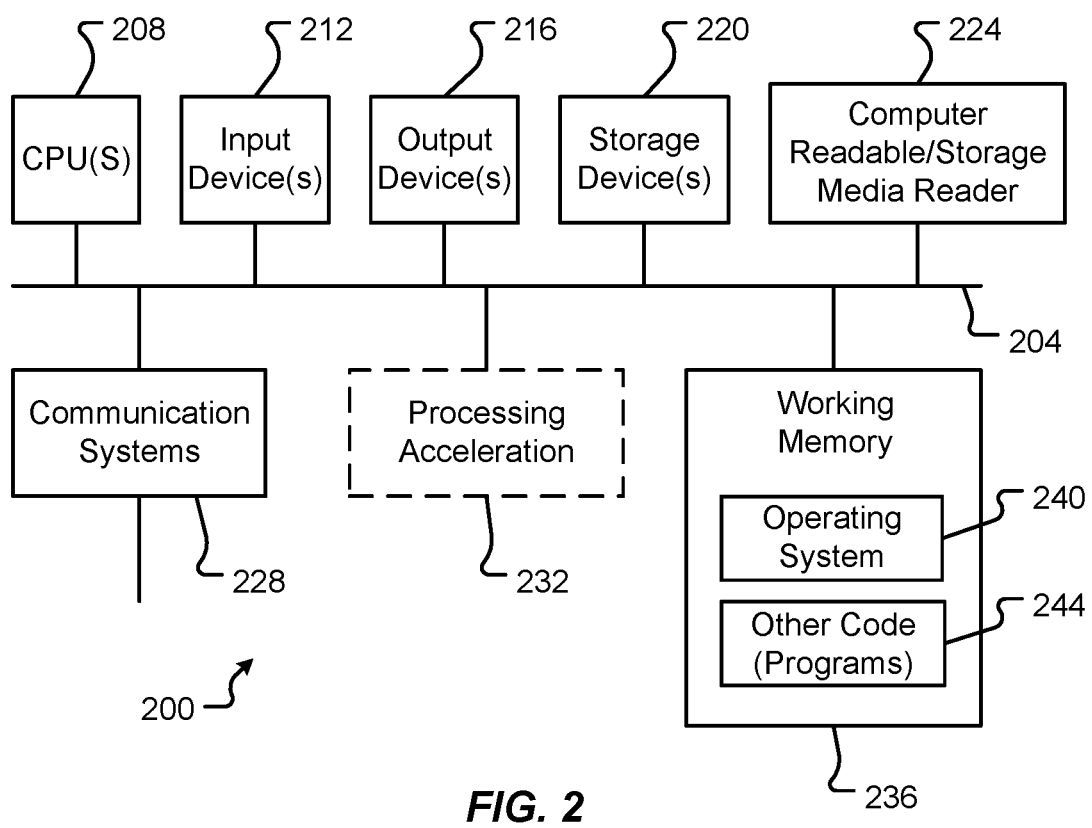
FIG. 2 is a block diagram illustrating elements of an example computing system in which embodiments of the present disclosure may be implemented.

FIG. 2 is a block diagram illustrating elements of an example computing system 200 in which embodiments of the present disclosure may be implemented. More specifically, this example illustrates one embodiment of a computer system 200 upon which the servers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computers such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
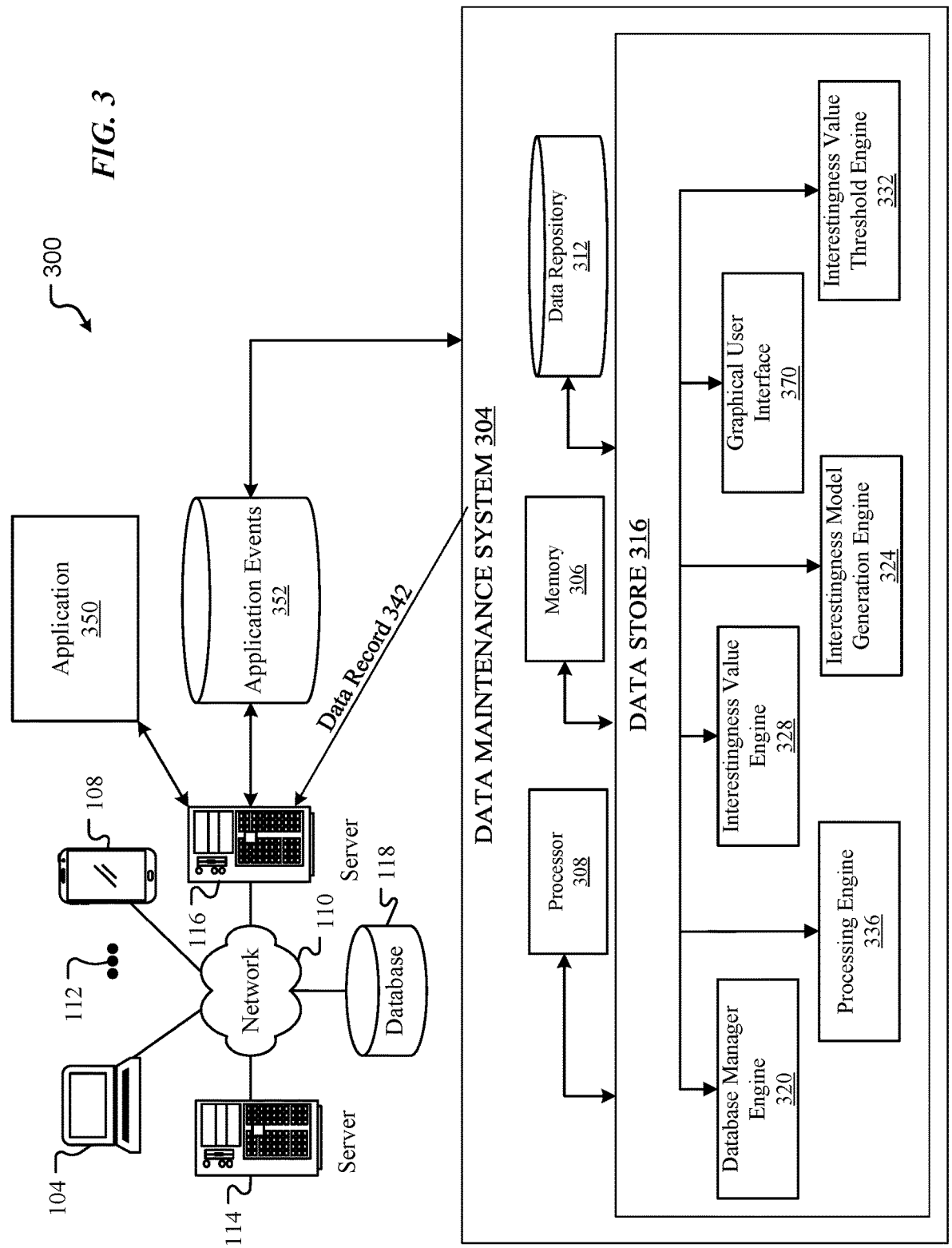
FIG. 3 is a block diagram illustrating elements of an example computing environment including an example data maintenance system in which embodiments of the present disclosure may be implemented.

FIG. 3 is a block diagram illustrating elements of an example computing environment 300 including an example data maintenance system 304 in which embodiments of the present disclosure may be implemented. The computing environment 300 includes similar elements such as the computers/servers 104, 108, 112, 114, 116, the network 110 and the database 118 illustrated in FIG. 1. Since these elements are discussed in FIG. 1, a description of these elements will be omitted. The computing environment 300 further includes an application 350, application events 352 and the data maintenance system 304. The application 350 may include, for example application(s) utilized by users of the computers 104, 108, 112, stored on servers such as server 114, 116 and utilized by the data maintenance system 304. Such application(s) may include financial/banking applications, medical applications, regulatory applications, etc. The application events 352 include data records (e.g., financial transactions, medical records, etc.) regarding a user's activities with respect to the application 350 or entered data with respect to the application 350. The application events 352 may be recorded and stored in a memory of the server(s) 114, 116, the database 118, data repository 312 (as discussed in greater detail below) or other local or remote storage devices.

At least one of the servers 114, 116 executes the application 350, for example a web-based, e-commerce application that is accessed by the plurality of computers 104, 108, 112 via the network 110. In one example embodiment of the present disclosure, the application 350 may be a series of processor-executable instructions stored in a processor-readable storage medium on the server(s) 114, 116 and being executed by one or more processors within the server(s) 114, 116 and/or other devices. The series of processor-executable instructions included in the application 350 may enable the application 350 to receive and process inputs and provide outputs based on the processing of the inputs. The inputs may be received manually from users or from other applications, external machinery, databases and the like.

Certain elements may be discussed below with respect to the web-based, e-Commerce application only by the way of illustration but not limitation. It can be appreciated that various other types of applications such as, but not limited to, telecommunication applications facilitating network communications between various devices, data access and management applications, medical applications, financial applications, and the like may be monitored by the data maintenance system 304 in accordance with examples discussed herein.

The various operations that occur during the normal execution of the application 350 such as but not limited to, accessing the application 350 by the computers 104, 108, 112, the user requests fulfilled by the application 350, any changes to database 118 made by the application 350, the success or failure of the various interactions from one or more of the computers 104, 108, 112 are recorded in the application events 352. The application events 352 may be temporarily cached on the server(s) 114, 116 and may be offloaded to a data store 316 of the maintenance system 304 at predetermined times. The application events 352 therefore include valuable data on the operation of the application 350.

Examples of the data maintenance system 304 discussed herein are configured for data retention and removal based on the interestingness of the data compared with the purpose or goal of an application 350 associated with the data repository 312. According to some embodiments of the present disclosure, if the purpose or goal of a financial application is to determine fraudulent activity as compared with normal activity associated with a customer's account, then the attributes, characteristics and/or behavior of a customer's financial transactions should be considered when identifying interestingness. However, if the goal or purpose of a medical application is to determine which medical tests are important based on the current health of the patient, then the type of medical tests in view of the current health of the patient should be considered when identifying interestingness. For example, the length of time of a health check test result (e.g., a blood test result) for a patient may be calculated based on the current health of the patient. Moreover, if the purpose or goal of a general data protection regulation (GDPR) application is to determine risks to data breach, then the type of data provided should be considered when identifying interestingness. For example, data containing significant amounts of personal data increases the potential risk and penalty if a data breach occurs. Furthermore, if the purpose or goal of a machine learning application that uses predictive modeling is to determine predictions made by machine learning models, then the type of data that has an impact on the predictive models should be considered when identifying interestingness. For example, regression coefficients, shapely values, variance explained, or other methods can be used on the data to determine the impact on the predictive models.

It can be appreciated that the data maintenance system 304 can be executed by the server(s) 114, 116 that executes the application 350 or by another machine with the processor 308 and the data store 316. The data maintenance system 304 may be at the same location as the server(s) 114, 116 or it may be located remotely from the server(s) 114, 116. In an example embodiment of the present disclosure, the application events 352 may also be located remotely from the data maintenance system 304. In fact, the data maintenance system 304 may thus be connected to a plurality of machines each of which may be executing a different application for which the data maintenance system 304 executes data retention and removal processes based on the interestingness of the data compared with the purpose or goal of an application. For the purposes of brevity, the below description will be confined to one application although the features discussed herein are equally applicable when the data maintenance system 304 is executing a plurality of data retention and removal processes based on the interestingness of the data compared with the purpose or goal of an application corresponding to a plurality of applications.

The data maintenance system 304 includes at least a memory 306, a processor 308, a data repository 312 and a data store 316 including a processing engine 336, a database manager engine 320, an interestingness model generation engine 324, an interestingness value engine 328, an interestingness value threshold engine 332 and a graphical user interface (GUI) 370. Examples of the data maintenance system 304 discussed herein are configured for data retention and removal based on the interestingness of the data compared with the purpose or goal of an application. This is accomplished first by the interestingness model generation engine 324.

The interestingness model generation engine 324 is software including routines for retrieving the data from memory 306 or other memory device and generating a model for the application based on the data. In some implementations, the interestingness model generation engine 324 is a set of instructions executable by the processor 308 to provide the functionality described below for generating the model. In some implementations, the interestingness model generation engine 324 is stored in the memory 306 and is accessible and executable by the processor 308. In some implementations of the present disclosure, the interestingness model generation engine 324 is adapted for cooperation and communication with the processor 308 and other components of the computing environment 300.

The interestingness model generation engine 324 receives interestingness information regarding the application associated with the data to be stored in the data repository 312. This interestingness information is based on the type of application associated with the data repository 312. For example, with financial applications, the interestingness information may include financial transactions between customers and banking institutions, including but not limited to bankcards (e.g., credit cards, debit cards, etc.) transactions (e.g., charges, cash withdrawals, etc.) accounts (e.g., savings, checking, etc.) transactions (withdrawals, deposits, transfers, etc.), etc. With respect to medical applications, the interestingness information may include electronic medical records associated with patients. Various other applications can be envisioned without departing from the spirit and scope of the present disclosure. Once the interestingness information for a particular application has been received, the interestingness model generation engine 324 determines features from the interestingness information and generates a model for a particular application. The model includes various types of relevance of items associated with the application. In some implementations of the present disclosure, the interestingness model generation engine 324 also updates the model based on user input or based on changes to the application.

After a model has been generated by the interestingness model generation engine 324, the processing engine 336 is used to discover application events 352 associated with the application 350. The processing engine 336 is software including routines for discovering the application events 352 and for processing the information. In some implementations of the present disclosure, the processing engine 336 is a set of instructions executable by the processor 308 to provide the functionality described below for processing the information. In some implementations, the processing engine 308 is stored in the memory 306 and is accessible and executable by the processor 308. In some implementations of the present disclosure, the processing engine 336 is adapted for cooperation and communication with the processor 308 and other components of the computing environment 300.

The processing engine 336 transmits the application events 352 to database 118, memory 306 or any other memory or database. According to one embodiment of the present disclosure, after all of the application events 352 have been discovered by the processing engine 336, the database manager engine 320 generates the data repository 312 which is a database or tables of information based on the discovered application events 352. According to an alternative embodiment of the present disclosure, after at least one application event 352 has been discovered by the processing engine 336, the databased manager engine 320 generates the data repository 312. The database manager engine 320 includes processor-executable instructions to generate a database or tables of information based on the application events 352.

After the data repository 312 has been generated with at least one application event 352 or if the data repository 312 has been generated with multiple application events 352, the interestingness value engine 328 is used to assign an interestingness value to each of the application events 352. The interestingness value engine 328 is software including routines for assigning an interestingness value to the application events 352 stored in data repository 312. In some implementations of the present disclosure, the interestingness value engine is a set of instructions executable by the processor 308 to provide the functionality described below for assigning an interestingness value to the application events 352 stored in data repository 312. In some implementations, the interestingness value engine 328 is stored in the memory 306 and is accessible and executable by the processor 308. In some implementations of the present disclosure, the interestingness value engine 328 is adapted for cooperation and communication with the processor 308 and other components of the computing environment 300.

As discussed in greater detail below with FIGS. 7 and 8, the application events 352 are stored as data records of data tables in the data repository 312. The data records include several fields or attributes including an interestingness value field. The interestingness value may be a value between 0 and 1, which quantifies how interesting, relevant and/or important the data record is to the application. According to some embodiments of the present disclosure, the interestingness value engine 328 compares the values in one or more fields of the data record with corresponding values in the one or more fields of the interesting model to determine an interestingness value. In some implementations of the present disclosure, the interestingness value engine 328 uses multiple data records to determine an interestingness value for one or more data records. Furthermore, in some implementations of the present disclosure, the interestingness value engine 328 can adjust a previously assigned interestingness value for a data record either up or down based on subsequent data records.

The interestingness value may be determined based on rules or criteria indicative of malicious activity, such as a number of failed logins within a predetermined (e.g., short) period of time occurring at one of the user devices 104, 108, 112, a large number of transactions being processed within a predetermined (e.g., short) period of time by one of the databases 118 or by one of the servers 114, 116.

According to embodiments of the present disclosure, the interestingness value threshold engine 332 is used to either retain or remove data records having an interestingness value at or below a threshold value. The interestingness value threshold engine 332 is software including routines for filtering (e.g., retaining or removing) data records stored in the data repository 312 having an interestingness value at or below a threshold value. In some implementations of the present disclosure, the interestingness value threshold engine 332 is a set of instructions executable by the processor 308 to provide the functionality described below for filtering (e.g., retaining or removing) data records stored in the data repository 312 having an interestingness value at or below a threshold value. In some implementations of the present disclosure, the interestingness value threshold engine 332 is stored in the memory 306 and is accessible and executable by the processor 308. In some implementations of the present disclosure, the interestingness value threshold engine 332 is adapted for cooperation and communication with the processor 308 and other components of the computing environment 300.

In some implementations of the present disclosure, the interestingness value threshold engine 332 receives a request via graphical user interface 370, for example, to provide maintenance on the data records stored in the data repository 312. The request can be received ad-hoc, or the request can be programmed such that the request is implemented periodically (every month, every quarter, every year, etc.) to remove data records that have lost their interestingness as compared with the purpose or goal of the application. According to embodiments of the present disclosure, a data record 342 can be transmitted to the other computer systems 104, 108, 112, the other servers 114, 116 or the database 118.

Figure 4:
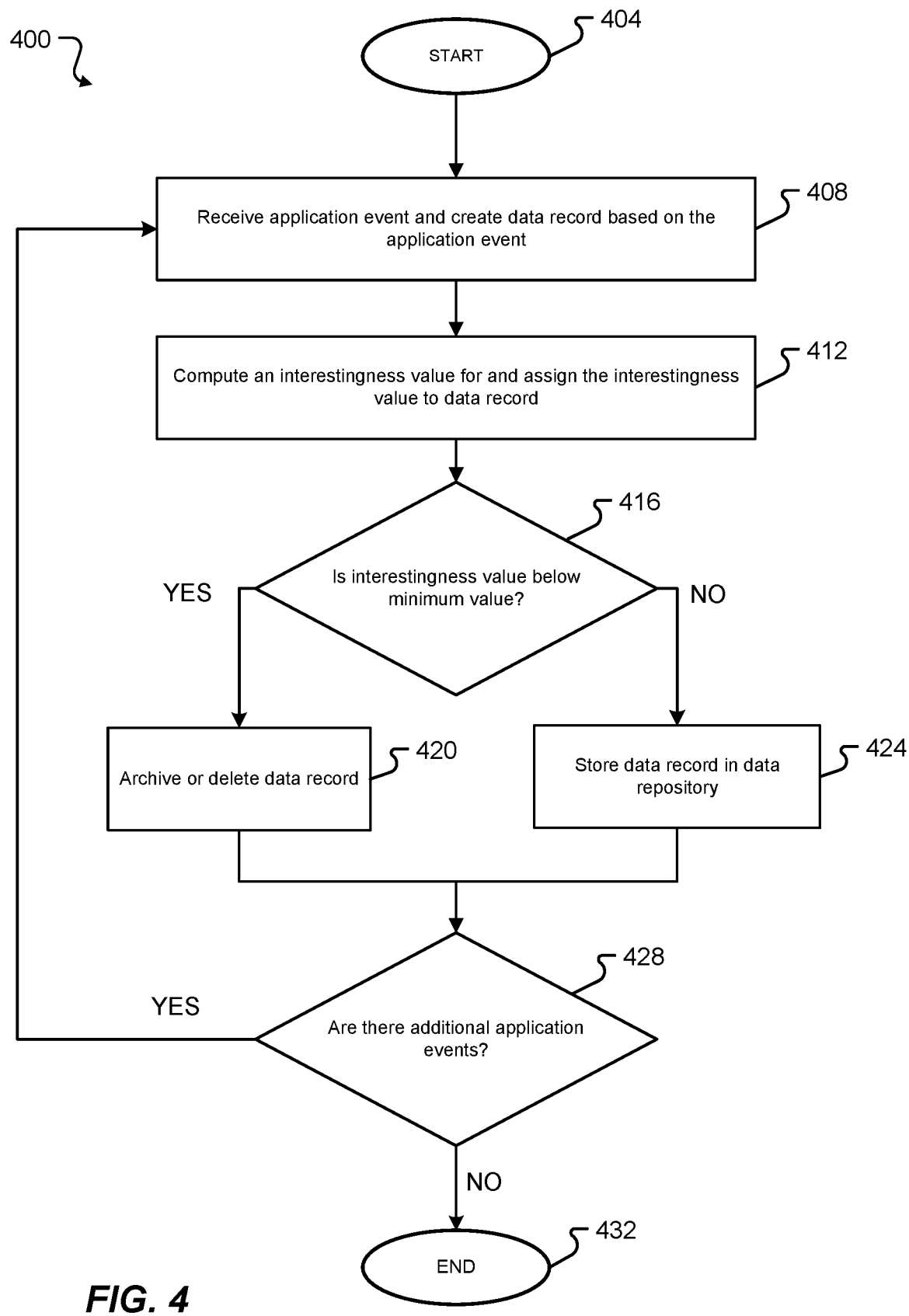
FIG. 4 is a flowchart illustrating an example method for computing an interestingness value for and assigning an interestingness value to data records according to embodiments of the present disclosure.

FIG. 4 is a flowchart illustrating an example method 400 for computing an interestingness value for and assigning an interestingness value to data records according to embodiments of the present disclosure. While a general order of the steps of method 400 is shown in FIG. 4, method 400 can include more or fewer steps or can arrange the order of the step differently than those shown in FIG. 4. Further, two or more steps may be combined in one step. Generally, the method 400 starts with a START operation at step 404 and ends with an END operation at step 432. The method 400 can be executed as a set of computer-executable instructions executed by a computer system (e.g., CPU(s) 208, data maintenance system 304, the processor 308, etc.) and encoded or stored on a computer readable medium. Hereinafter, the method 400 shall be explained with reference to the systems, components, modules, applications, software, data structures, user interfaces, etc. described in conjunction with FIGS. 1-3 and 7-10.

Method 400 begins with START operation at step 404 and proceeds to step 408, where the processor 308 and the processing engine 336 of the data maintenance system 304 receive an application event 352. The application event 352 may be, for example, a financial transaction for a financial system, a patient's medical record for a medical records system, a compliance record for a regulatory system, etc. The application event 352 may be received during the course of the execution of the application 350. For example, if the application 350 is a web-based eCommerce application, the application event 352 may include information or data from the hardware executing the application, information from the user sessions including the log in information, data retrieved, transactions conducted, data entered, data modified, data removed, database connectivity, network performance and the like. According to embodiments of the present disclosure, the application event 352 may be used to generate the data repository 312, wherein the application event 352 is stored as a data record in the data repository 312. According to one embodiment of the present disclosure, the data repository 312 is generated after at least one data record is create. According to an alternative embodiment of the present disclosure, the data repository 312 is generated after more than one or several data records have been created.

After the processor 308 and the processing engine of the data maintenance system 304 receive the application event 352 and the data record has been created at step 408, method 400 proceeds to step 412, where the processor 308 and the interestingness value engine 328 of the data maintenance system 304 compute an interestingness value for and assign the interestingness value to the data record. This interestingness value is computed based on a function that yields a value between 0 and 1 based on how interesting, relevant and/or important a particular data record is to the purpose or goal of an application associated with the data repository 312. As discussed in greater detail above in FIG. 3 regarding the interestingness model generation engine 324, an interestingness model is created based on the purpose or goal of the application. The interestingness model includes various attributes or fields that are used to be compared with the attributes and fields of the data records. The more interesting, relevant and/or important a data record is to the purpose or goal of the application (i.e., the more matches between the fields and attributes of the interestingness model and the data record), the higher the interestingness value (e.g., the closer the interestingness value is to 1).

For example, if the data record relates to a financial transaction, an interestingness value may be determined based on the amount of the transaction, the time the transaction was made, the location of the transaction as compared to the address of the account holder associated with the transaction, etc. Moreover, if the present transaction associated with the account holder is not the first time the account holder uses the account, the interestingness value for the present transaction may be determined based on a pattern of transactions established by the account holder (e.g., the account holder regularly makes the same or a similar transaction at an established time interval). If the present transaction associated with the account holder is the first time the account holder uses the account, the interestingness value computed and assigned may be a conservative value of 0.5 or 0.4 for example, given that there might not be enough historical data stored in the data repository for the account holder for comparative purposes.

According to embodiments of the present disclosure, for an initial transaction or for limited transactions for the account holder, the computed and assigned transaction value may be adjusted based on subsequent transactions for the account holder. Therefore, when a conservative interestingness value of 0.5 or 0.4 has been computed and assigned for an initial transaction or for limited transactions for an account holder, the interestingness value for the initial transaction or the previous limited transactions may be adjusted based on a pattern established for subsequent transaction(s) for the account holder. For example, the conservative interestingness value of 0.5 or 0.4 may be lowered to an interestingness value of 0.2 or 0.1 for the initial or for previous limited transactions for the same account holder. Moreover, the interestingness value for the subsequent transaction(s) for the account holder may be assigned a value lower than the conservative interestingness value of 0.5 or 0.4 (e.g., 0.2 or 0.1). For example, a transaction for account holder Jane Doe, at Acme Gas, in the amount of $80.00 would not be seen as very unusual and may be assigned an interestingness value of 0.2, for example, given that similar transactions by Jane, at Acme Gas, in substantially the same amount, are made on a weekly, bi-weekly or monthly basis. Moreover, previous transactions having the same account holder, at the same location in substantially the same amount made over a year ago are taken into consideration when computing and assigning an interestingness value.

After the processor 308 and the interestingness value engine 328 of the data maintenance system 304 computes an interestingness value for and assigns the interestingness value to the data record at step 412, method 400 proceeds to decision step 416, where the processor 308 of the data maintenance system 304 determines if the interestingness value for the data record is below a minimum interestingness value. According to embodiments of the present disclosure, a minimum interestingness value may initially be set such that data records that have a limited interestingness factor or no interestingness factor at all are either deleted or archived in order to conserve memory. If the interestingness value of the data record is below the minimum interestingness value (YES) at decision step 416, method 400 proceeds to step 420 where the processor 308 of the data maintenance system 304 either archives the data record remote from the data repository 312 or deletes the data record. If the interestingness value of the data record is not below the minimum interestingness value (NO) at decision step 416, method 400 proceeds to step 424 where the processor 308 of the data maintenance system 304 stores the data record in the data repository.

After the processor 308 of the data maintenance system 304 archives or deletes the data record at step 420 or stores the data record in the data repository 312 at step 424, method 400 proceeds to decision step 428, where the processor 308 and the processing engine 336 of the data maintenance system 304 determine if there are additional application events 352. If there are additional application events 352 (YES) at decision step 428, method 400 returns to step 408 where processor 308 and the processing engine 336 of the data maintenance system 304 receives the application event 352. If there are no additional application events 352 (NO) at decision step 428, method 400 ends with END operation at step 432.

Figure 5:
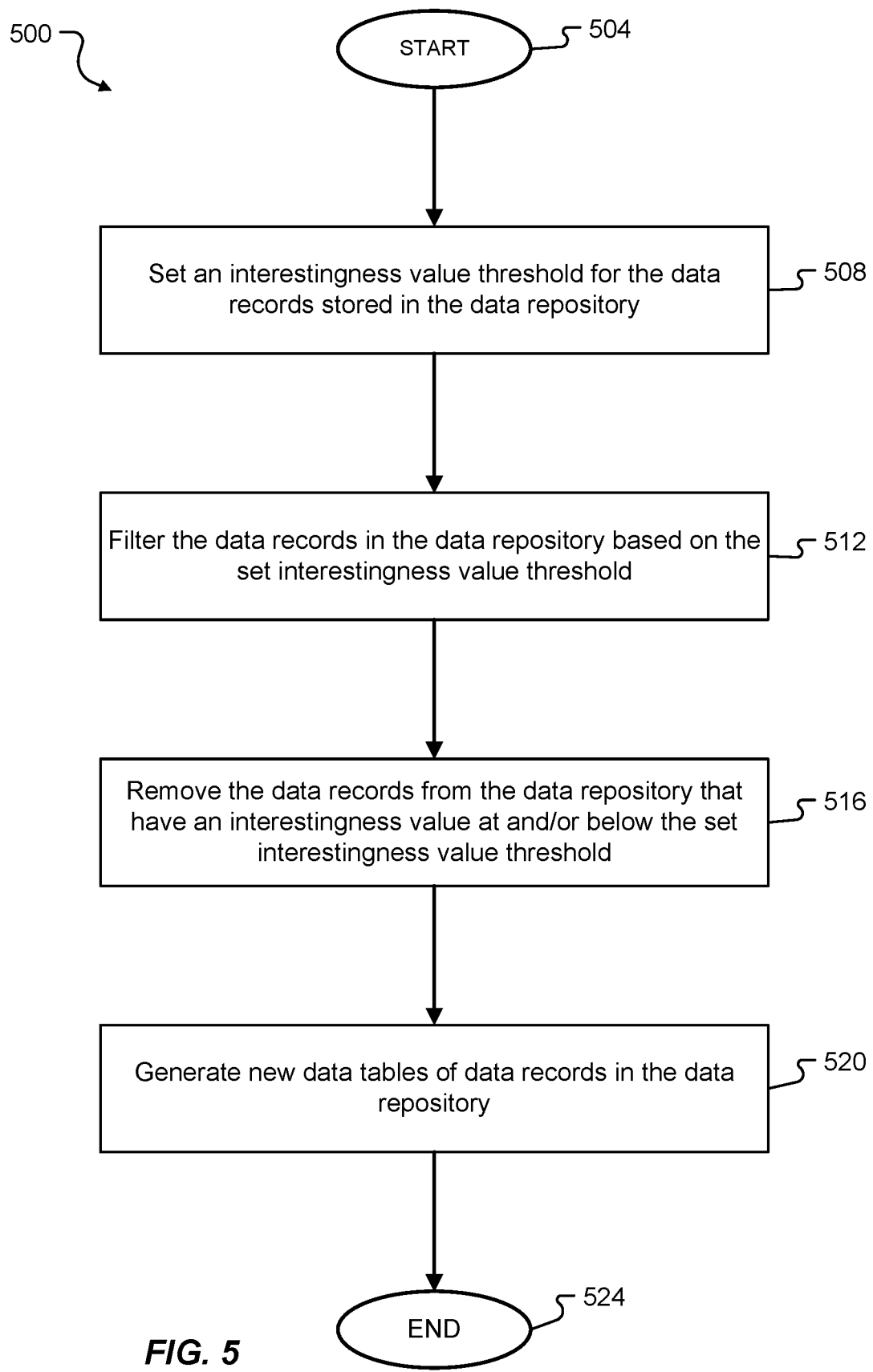
FIG. 5 is a flowchart illustrating an example method of data retention and removal based on the interestingness of data records compared with the purpose or goal of an application associated with a data repository according to an embodiment of the present disclosure.

FIG. 5 is a flowchart illustrating an example method 500 of data retention and removal based on the interestingness of data records compared with the purpose or goal of an application associated with a data repository according to embodiments of the present disclosure. While a general order of the steps of method 500 is shown in FIG. 5, method 500 can include more or fewer steps or can arrange the order of the step differently than those shown in FIG. 5. Further, two or more steps may be combined in one step. Generally, the method 500 starts with a START operation at step 504 and ends with an END operation at step 524. The method 500 can be executed as a set of computer-executable instructions executed by a computer system (e.g., CPU(s) 208, data maintenance system 304, the processor 308, etc.) and encoded or stored on a computer readable medium. Hereinafter, the method 500 shall be explained with reference to the systems, components, modules, applications, software, data structures, user interfaces, etc. described in conjunction with FIGS. 1-3 and 7-10.

Method 500 begins with START operation at step 504 and proceeds to step 508, where the processor 308 and the interestingness value threshold engine 332 of the data maintenance system 304 set an interestingness value threshold for data records stored in a data repository 312. According to embodiments of the present disclosure, a user sets an interestingness value threshold using GUI 370 for example, as discussed in greater detail in FIGS. 9 and 10. As discussed above with reference to FIG. 4, each of the data records of the data repository 312 includes an interestingness value assigned based on how interesting, relevant and/or important a particular data record is to the purpose or goal of an application associated with the data repository 312. The more interesting, relevant and/or important a data record is to the purpose or goal of an application associated with the data repository 312, the higher the interestingness value (e.g., the closer the interestingness value is to 1). According to embodiments of the present disclosure, the interestingness value threshold could be a single value (e.g., the value 0.2) or a range of values (e.g., all values equal to and below 0.3). After the processor 308 and the interestingness value threshold engine 332 of the data maintenance system 304 set an interestingness value threshold for the data records stored in the data repository 312 at step 508, method 500 proceeds to step 512, where processor 308 of the data maintenance system 304 filters the data records in the data repository 312 based on the set interestingness value threshold. After the processor 308 of the data maintenance system 304 filters the data records in the data repository 312 based on the set interestingness value threshold at step 512, method 500 proceeds to step 516, where the processor 308 of the data maintenance system 304 removes the data records from the data repository 312 that have an interestingness value at and/or below the interestingness value threshold.

After the processor 308 of the data maintenance system 304 removes the data records from the data repository 312 that have an interestingness value at and/or below the interestingness value threshold, method 500 proceeds to step 520, where the processor 308 of the maintenance system 304 generates new data tables of data records in the data repository 312. After the processor 308 of the maintenance system 304 generates new data tables of data records in the data repository 312, method 500 ends with END operation at step 524.

Figure 6:
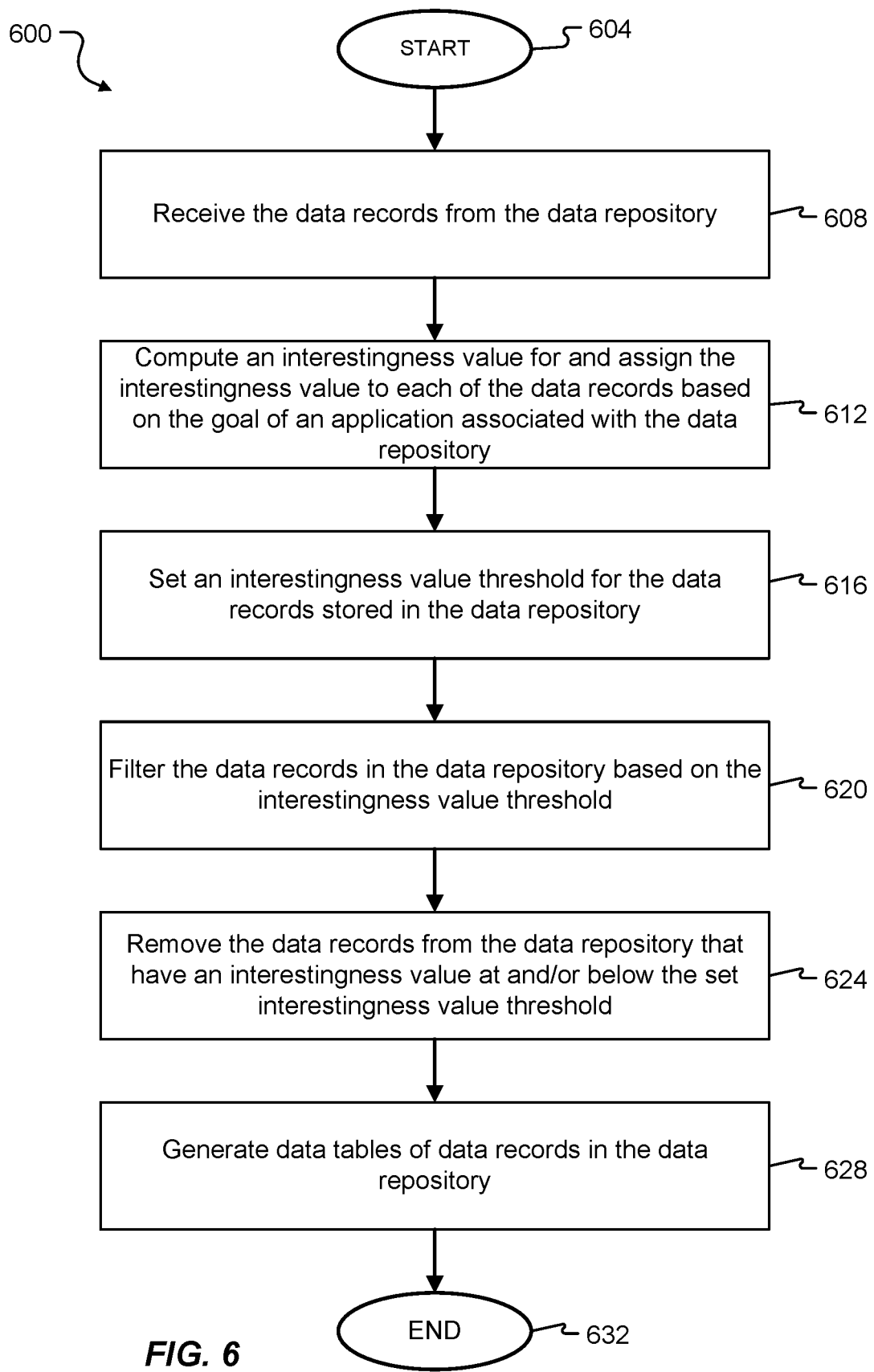
FIG. 6 is a flowchart illustrating an example method of data retention and removal based on the interestingness of data records compared with the purpose or goal of an application associated with a data repository according to an embodiment of the present disclosure.

FIG. 6 is a flowchart illustrating an example method 600 of data retention and removal based on the interestingness of data records compared with the purpose or goal of an application associated with a data repository according to embodiments of the present disclosure. While a general order of the steps of method 600 is shown in FIG. 6, method 600 can include more or fewer steps or can arrange the order of the step differently than those shown in FIG. 6. Further, two or more steps may be combined in one step. Generally, the method 600 starts with a START operation at step 604 and ends with an END operation at step 632. The method 600 can be executed as a set of computer-executable instructions executed by a computer system (e.g., CPU(s) 208, data maintenance system 304, the processor 308, etc.) and encoded or stored on a computer readable medium. Hereinafter, the method 600 shall be explained with reference to the systems, components, modules, applications, software, data structures, user interfaces, etc. described in conjunction with FIGS. 1-3 and 7-10.

Method 600 begins with START operation at step 604 and proceeds to step 608, where the processor 308 of the data maintenance system 304 receives the data records from the data repository 312. After the processor 308 of the data maintenance system 304 receives the data records from the data repository 312 at step 608, method 600 proceeds to step 612, where the processor 308 and the interestingness value engine 328 of the data maintenance system 304 compute an interestingness value for and assigns the interestingness value to each of the data records based on the purpose or goal of the application associated with the data repository 312. This interestingness value is computed by a function that yields a value between 0 and 1 based on how interesting, relevant and/or important a particular data record is to the purpose or goal of an application associated with the data repository 312. The more interesting, relevant and/or important a data record is to the purpose or goal of an application associated with the data repositor 312 the higher the interestingness value (e.g., the closer the interestingness value is to 1). For example, if the data record relates to a financial transaction, an interestingness value may be determined based on the amount of the transaction, the time the transaction was made, the location of the transaction as compared to the address of the account holder associated with the transaction, etc. Moreover, if the present transaction associated with the account holder is not the first time the account holder uses the account, the interestingness value for the present transaction may be determined based on a pattern of transactions established by the account holder (e.g., the account holder regularly makes the same or a similar transaction at an established time interval). The interestingness value computed and assigned may be a conservative value of 0.5 or 0.4 for example, given that there might not be enough historical data stored in the data repository for the account holder for comparative purposes. According to embodiments of the present disclosure, for an initial or limited transactions for the account holder the computed and assigned transaction value may be adjusted based on subsequent transactions for the account holder. Therefore, when a conservative interestingness value of 0.5 or 0.4 has been computed and assigned for an initial transaction or for limited transactions for an account holder, the interestingness value for the initial transaction or the previous limited transactions may be adjusted based on a pattern established for subsequent transaction(s) for the account holder. For example, the conservative interestingness value of 0.5 or 0.4 may be lowered to an interestingness value of 0.2 or 0.1 for the initial or for previous limited transactions for the same account holder. Moreover, the interestingness value for the subsequent transaction(s) for the account holder may be assigned a value lower than the conservative interestingness value of 0.5 or 0.4 (e.g., 0.2 or 0.1). For example, a transaction for account holder Jane Doe, at Acme Gas, in the amount of $80.00 would not be seen as very unusual and may be assigned an interestingness value of 0.2, for example, given that similar transactions by Jane, at Acme Gas, in substantially the same amount, are made on a weekly, bi-weekly or monthly basis. Moreover, previous transactions having the same account holder, at the same location in substantially the same amount made over a year ago are taken into consideration when computing and assigning an interestingness value.

After the processor 308 and the interestingness value engine of the data maintenance system 304 compute an interestingness value for and assigns the interestingness value to each of the data records based on the goal of the application associated with the data repository 312 at step 612, method 600 proceeds to step 616, where the processor 308 and the interestingness value threshold engine 332 of the data maintenance system 304 set an interestingness value threshold for the data records stored in the data repository 312. According to embodiments of the present disclosure, a user sets an interestingness value threshold using GUI 370 for example, as discussed in greater detail in FIGS. 9 and 10. According to embodiments of the present disclosure, the interestingness value threshold could be a single value (e.g., the value 0.2) or a range of values (e.g., all values equal to and below 0.3). After the processor 308 and the interestingness value threshold engine 332 of the data maintenance system 304 set an interestingness value threshold for the data records stored in the data repository 312 at step 616, method 600 proceeds to step 620, where the processor 308 of the data maintenance system 304 filters the data records in the data repository 312 based on the set interestingness value threshold. After the processor 308 of the data maintenance system 304 filters the data records in the data repository 312 based on the set interestingness value threshold at step 620, method 600 proceeds to step 624, where the processor 308 of the data maintenance system 304 removes the data records from the data repository 312 that have an interestingness value at and/or below the interestingness value threshold.

After the processor 308 of the data maintenance system 304 removes the data records from the data repository 312 that have an interestingness value at and/or below the interestingness value threshold at step 624, method 600 proceeds to step 628, where the processor 308 of the maintenance system 304 generates new data tables of data records in the data repository 312. After the processor 308 of the maintenance system 304 generates new data tables of data records in the data repository 312 at step 628, method 600 ends with END operation at step 632.

FIG. 7 is an example financial system data table 700 representing example financial transaction data records 702 collected for use in a data maintenance system according to an embodiment of the present disclosure. In particular, the financial system data table 700 includes several fields or attributes including, but not limited to a transaction number field 704, a user field 708, a time field 712, a location field 716, an amount field 720, an approval field 724, other fields 728 and an interestingness value field 732. The transaction number 702 is generated each time the user (e.g., customer, account holder, etc.) uses the financial system. According to embodiments of the present disclosure, use of the financial system may include credit card transactions, debit card transactions, banking transactions, etc. The financial system data table 700 further stores time information 712 (e.g., the time at which the transaction was made), location information 716 (e.g., a code for the location where the transaction was made), amount information 720 (e.g., the total amount of the transaction) and an approval indication (e.g., an indication of whether the transaction was approved or declined). Other information 728 may be included for each of the financial transaction data records 702. An interestingness value 732 is computed based on one or more of the attributes 708-728 as well as information from one or more of the other financial transaction data records 702. An interestingness value algorithm or function might, for example, consists of layers of information from relatively static (e.g., updated, weekly, monthly, quarterly, semi-annually, annually, etc.) elements (e.g., attributes 708-728 identified above) to relatively dynamic, substantially real in time, elements in order to increase the accuracy of the interestingness value. According to one embodiment of the present disclosure, each of the attributes (708-728) may be weighted the same or a different weight may be assigned when utilizing an interestingness value algorithm or function.

Although FIG. 7 illustrates transaction numbers 101-120 for Users A-G, for sake of simplicity, the remaining attributes 712-732 are only provided for Users A and B. At transaction number 101, User A performs a transaction at 17:12 (e.g., 5:12 p.m.) at location HT123 (e.g., the Bank X) in the about of $300.00 which has been approved. Other information such as the dates in which the transactions were made, etc., may be included in field 728. At transaction numbers 107, 114 and 120, User A performs similar transactions which were approved, at the same location, in the same amount and at substantially the same time. At transaction number 118, User A performs a transaction at 11:50 (11:50 a.m.) at a location YGH56 that is different from the usual location (HT123-Bank X) in the amount of $2,000.00 which was denied.

According to one embodiment of the present disclosure, each of the financial transaction data records 702 may be stored in the data repository 312 without an interestingness value being assigned. For example, an interestingness value is assigned to the financial transaction data records 702 at predetermined intervals (e.g., monthly, quarterly, semi-annually, annually, etc.). By assigning the interestingness values periodically to the financial transaction data records 702 stored in the data repository 312, allows the data maintenance system 304 time to develop patterns within the financial transaction data records 702. Accordingly, financial transaction numbers 101, 107, 114 and 120 may be assigned an interestingness value of 0.1 (not shown) for example, since a pattern has been established with User A making similar transactions at the same location, for the same amount, at substantially the same time. On the other hand, financial transaction number 118 may be assigned an interestingness value of 0.9, since this transaction may be seen as suspicious since this transaction is for a large amount, at a different location, at a different time and the transaction was denied.

According to an alternative embodiment of the present disclosure, each of the financial transaction data records 702 are assigned an interestingness value when stored in the data repository 312. According to this alternative embodiment of the present disclosure, financial transaction number 101 may be initially assigned a conservative interestingness value of 0.3 since a transaction pattern has not been established with User A. After subsequent transactions (e.g., financial transaction numbers 107, 114 and 120) have been made, a pattern may be established. As such, the subsequent transactions are given a lower interestingness value than financial transaction number 101. According to a further embodiment of the present disclosure, the interestingness value for financial transaction number 101 may be adjusted such that the interestingness value for financial transaction number 101 matches the interestingness value for financial transaction numbers 107, 114 and 120 (e.g., an interestingness value of 0.1).

Regardless of whether the interestingness value is assigned after the financial transaction data records 702 have been stored in the data repository 312 or assigned at the time each of the financial transaction data records 702 is stored, the interestingness value quantifies how interesting, relevant and/or important a particular data repository's data record is to the data repository's goal(s); the more interesting, relevant and/or important a data record is to the repository's goal(s) the higher the interestingness value (e.g., the closer the interestingness value is to 1). In the financial system discussed above, a financial fraud system is employed that detects anomalous transactions indicative of credit card theft.

FIG. 8 is an example medical records system data table 800 representing example medical data records 804 collected for patients used in a data maintenance system 304 according to an embodiment of the present disclosure. In particular, the medical records system data table 800 includes several fields or attributes including, but not limited to a test field 808 (e.g., the type of medical test performed on the patient), a date field 812 (the date in which the test was performed on the patient), a results field 816 (the results of the test performed on the patient), a status field 820 (e.g., the health of the patient) other fields 824 and an interestingness value field 828. An interestingness value is assigned to each of the tests performed on the patient based at least on the type of test performed on the patient, the date that the test was performed on the patient, the results of the test performed on the patient and the general health of the patient. For example, the interestingness value computed and assigned for a check-up performed on patient A that is in good health is 0.1 while the interestingness value computed and assigned for a check-up performed on patient C that is in fair health is 0.2. Referring back to Patient C, the interestingness value computed and assigned for a blood-test performed on Patient C that is in fair health is 0.2, but the interestingness value computed and assigned for a blood-test performed on Patient C after being diagnosed with cancer on Jan. 16, 2001 and the health of Patient C evaluated as being poor is 0.8. Again, the interestingness value quantifies how interesting, relevant and/or important a particular data repository's data record is to the data repository's goal(s); the more interesting, relevant and/or important a data record is to the repository's goal(s) the higher the interestingness value (e.g., the closer the interestingness value is to 1).

FIG. 9 is a graphical representation of an example graphical user interface (GUI) prompt 900 associated with a data maintenance system 304 for a financial system according to embodiments of the present disclosure. Prompt 900 is an example prompt for soliciting an interestingness value to filter data records for a financial system. According to embodiments of the present disclosure, the solicited interestingness value could be a single value (e.g., the value 0.2) or a range of values (e.g., all values equal to and below 0.3). Prompt 900 also includes a selection of how frequent the data records for the financial system should be filtered. As indicated in FIG. 9, the data records for the financial system are to be filtered on a quarterly basis.

FIG. 10 is a graphical representation of an example GUI prompt 1000 associated with a data maintenance system 304 for a medical records system according to embodiments of the present disclosure. Prompt 1000 is an example prompt for soliciting an interestingness value to filter data records for a medical records system. According to embodiments of the present disclosure, the solicited interestingness value could be a single value (e.g., the value 0.2) or a range of values (e.g., all values equal to and below 0.3). Prompt 1000 also includes a selection of how frequent the data records for the medical records system should be filtered. As indicated in FIG. 10, the data records for the medical records system are to be filtered on a monthly basis.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a processor; and
a memory coupled with and readable by the processor and storing therein a set of instructions which, when executed by the processor, causes the processor to:
receive application events associated with a first application and a second application,
wherein the first application and the second application are unrelated applications;
create data records in a data repository based on the application events for each of the first application and the second application;
compute a score for each of the data records based on a type of activity, a type of test or a type of data for each of the first application and the second application;
compute a score for a data record based on an overlapping application event for the first application and the second application;
determine if the computed score for each of the first application and the second application is different than the computed score for the data record based on the overlapping application event;
if the computed score for each of the first application and the second application is different than the computed score based on the overlapping application event, assign the computed score based on the overlapping application event to the data record based on the overlapping application event;
remove or retain each of the data records in the data repository based on the assigned computed score based on the overlapping application event;
update the data repository based on removed or retained data records;
receive a threshold score;
compare the threshold score to the assigned computed score for each of the removed or retained data records to determine which removed or retained data records have an assigned score below the threshold score; and
remove the removed or retained data records having a score below the threshold score,
wherein the data records are stored in data tables of the data repository.

2. The system according to claim 1, wherein the set of instructions, when executed by the processor, causes the processor to:
if the computed score based on the overlapping application event is the same as the computed score for each of the first application and the second application, assign the computed score for each of the first application and the second application to each of the data records;
remove or retain each of the data records in the data repository based on the assigned score for each of the first application and the second application; and update the data repository based on removed or retained data records.

3. The system according to claim 2, wherein the assigned computed score is assigned to each of the data records after each data record has been created.

4. The system according to claim 3, wherein the set of instructions, when executed by the processor, causes the processor to compute an adjusted score to a stored data record based on a subsequent application event.

5. The system according to claim 2, wherein the assigned computed score is assigned to each of the data records after all of the data records have been created.

6. The system according to claim 5, wherein compute a score for each of the data records further includes consider previously stored data records in computing the score.

7. The system according to claim 2, wherein the first application and second application include financial applications, medical applications, regulatory applications, or machine learning applications.

8. The system according to claim 1, wherein the set of instructions, when executed by the processor, causes the processor to generate new data tables of data records based on stored data records not removed.

9. The system according to claim 1, wherein receive a threshold score includes receive the threshold score on a periodic basis.

10. The system according to claim 1, wherein receive a threshold score includes receive the threshold score on an ad-hoc basis.

11. A method, comprising:
receiving, by a processor, application events associated with a first application and a second application,
wherein the first application and the second application are unrelated applications;
creating, by the processor, data records in a data repository based on the application events for each of the first application and the second application;
computing, by the processor, a score for each of the data records based on a type of activity, a type of test or a type of data for each of the first application and the second application;
computing, by the processor, a score for a data record based on an overlapping application event for the first application and the second application;
determining, by the processor, if the computed score for each of the first application and the second application is different than the computed score for the data record based on the overlapping application event;
if the computed score for each of the first application and the second application is different than the computed score based on the overlapping application event, assigning, by the processor, the computed score based on the overlapping application event to the data record based on the overlapping application event;
removing or retaining, by the processor, each of the data records in the data repository based on the assigned computed score based on the overlapping application event;
updating, by the processor, the data repository based on removed or retained data records;
receiving, by the processor, a threshold score;
comparing, by the processor, the threshold score to the assigned computed score for each of the removed or retained data records to determine which removed or retained data records have an assigned score below the threshold score; and
removing, by the processor, the removed or retained data records having a score below the threshold score,
wherein the data records are stored in data tables of the data repository.

12. The method according to claim 11, further comprising:
if the computed score based on the overlapping application event is the same as the computed score for each of the first application and the second application, assigning, by the computed score for each of the first application and the second application to each of the data records;
removing or retaining, by the processor, each of the data records in the data repository based on the assigned score for each of the first application and the second application;
and updating, by the processor, the data repository based on removed or retained data records.

13. The method according to claim 12, further comprising assigning the assigned computed score to each of the data records after each data record has been created.

14. The method according to claim 13, further comprising computing an adjusted score for a stored data record based on a subsequent application event.

15. The method according to claim 12, further comprising assigning the assigned computed score to each of the data records after all of the data records have been created.

16. The method according to claim 15, further comprising computing the score for each of the data records based on previously stored data records.

17. The method according to claim 11, further comprising generating, by the processor, new data tables of data records based on stored data records not removed.

18. A non-transitory, computer-readable medium comprising a set of instructions stored therein which when executed by a processor, causes the processor to:
receive application events associated with a first application and a second application,
wherein the first application and the second application are unrelated applications;
create data records in a data repository based on the application events for each of the first application and the second application;
compute a score for each of the data records based on a type of activity, a type of test or a type of data for each of the first application and the second application;
compute a score for a data record based on an overlapping application event for the first application and the second application;
determine if the computed score for each of the first application and the second application is different than the computed score for the data record based on the overlapping application event;
if the computed score for each of the first application and the second application is different than the computed score based on the overlapping application event, assign the computed score based on the overlapping application event to the data record based on the overlapping application event;
remove or retain each of the data records in the data repository based on the assigned computed score based on the overlapping application event;
update the data repository based on removed or retained data records;
receive a threshold score;
compare the threshold score to the assigned computed score for each of the removed or retained data records to determine which removed or retained data records have an assigned score below the threshold score; and remove the removed or retained data records having a score below the threshold score, wherein the data records are stored in data tables of the data repository.

* * * * *